Dec. 12, 1933.  H. T. KINGSBURY  1,939,353
REGISTERING BANK
Filed Aug. 29, 1931   5 Sheets-Sheet 1
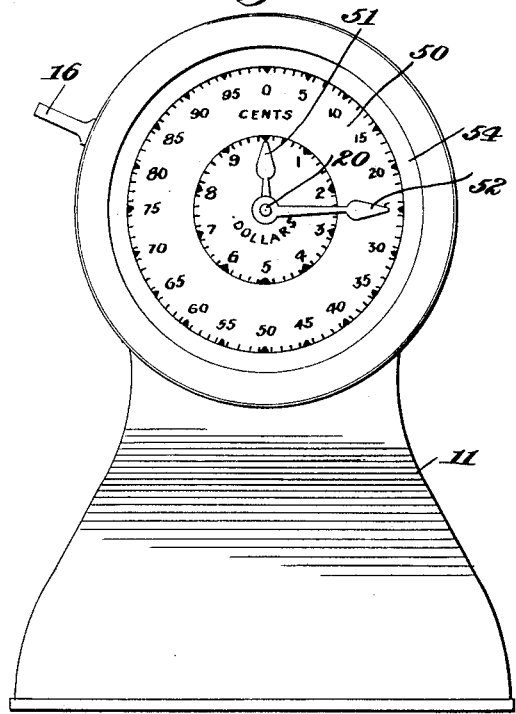
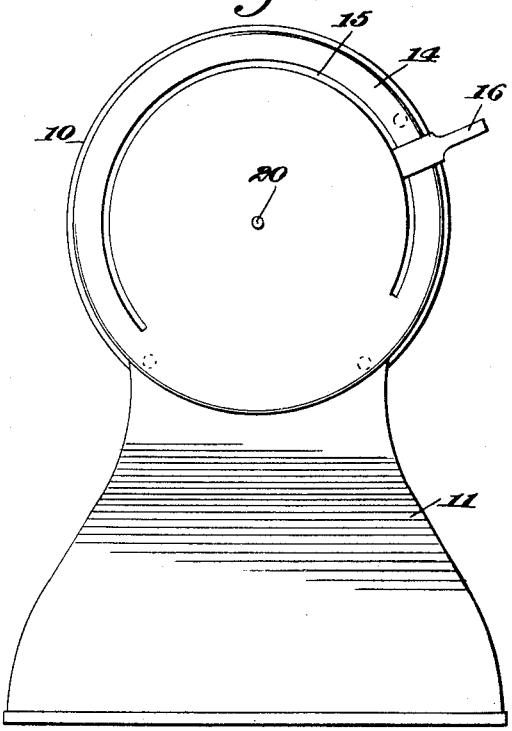
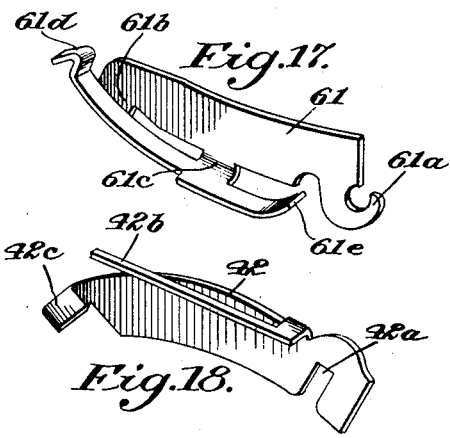
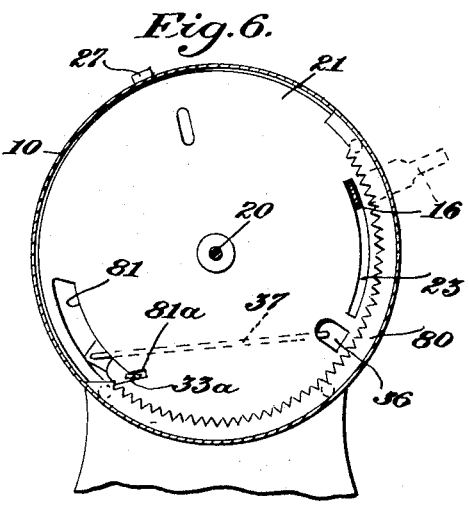
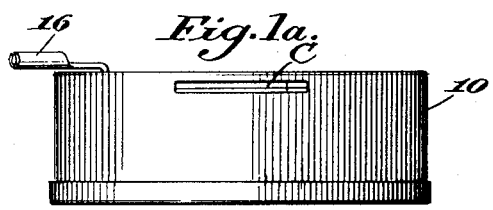
Inventor:
Harry T. Kingsbury,
by
Att'ys.

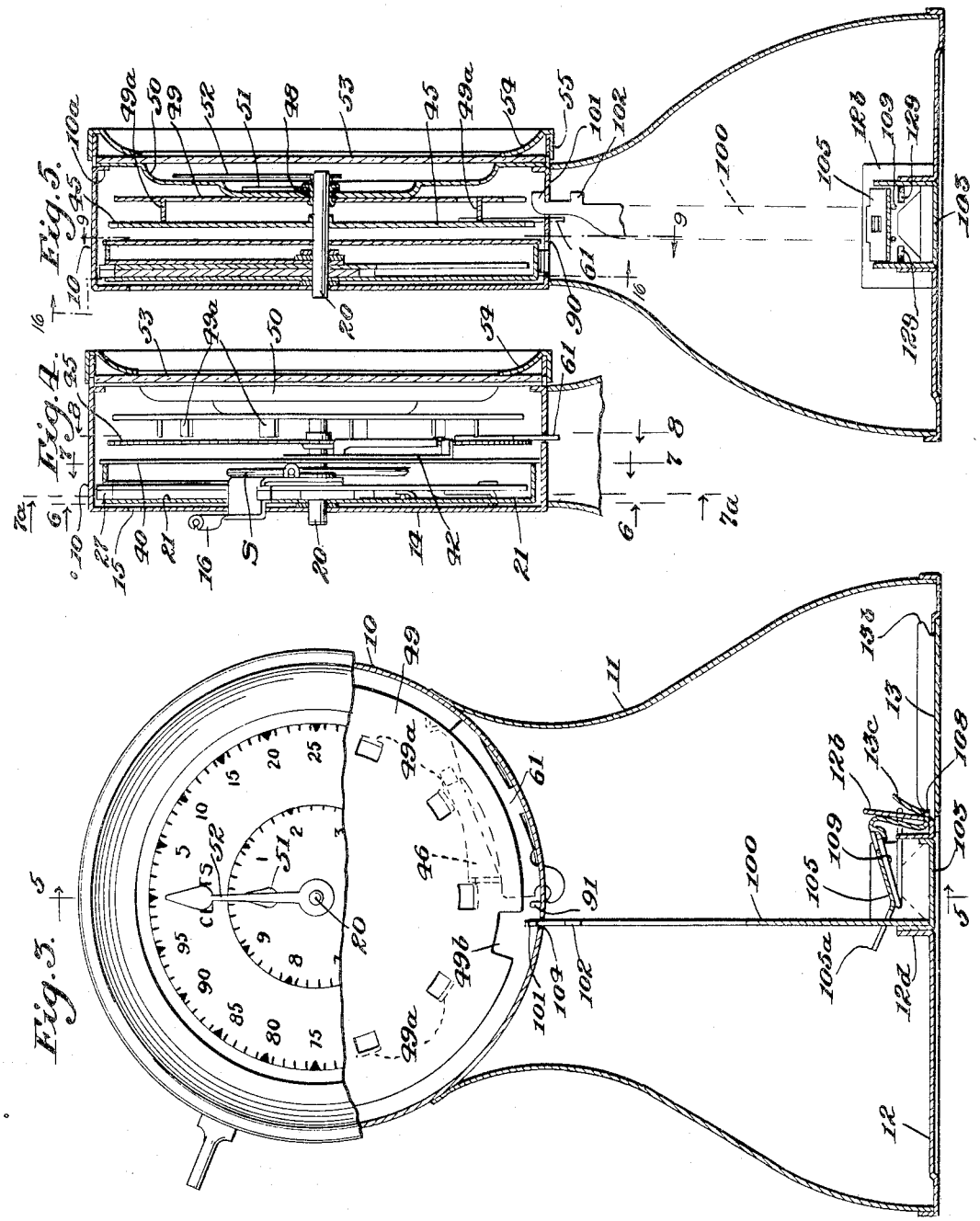

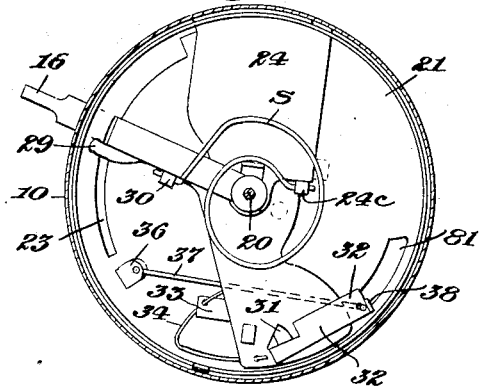

Dec. 12, 1933.   H. T. KINGSBURY   1,939,353
REGISTERING BANK
Filed Aug. 29, 1931   5 Sheets-Sheet 4
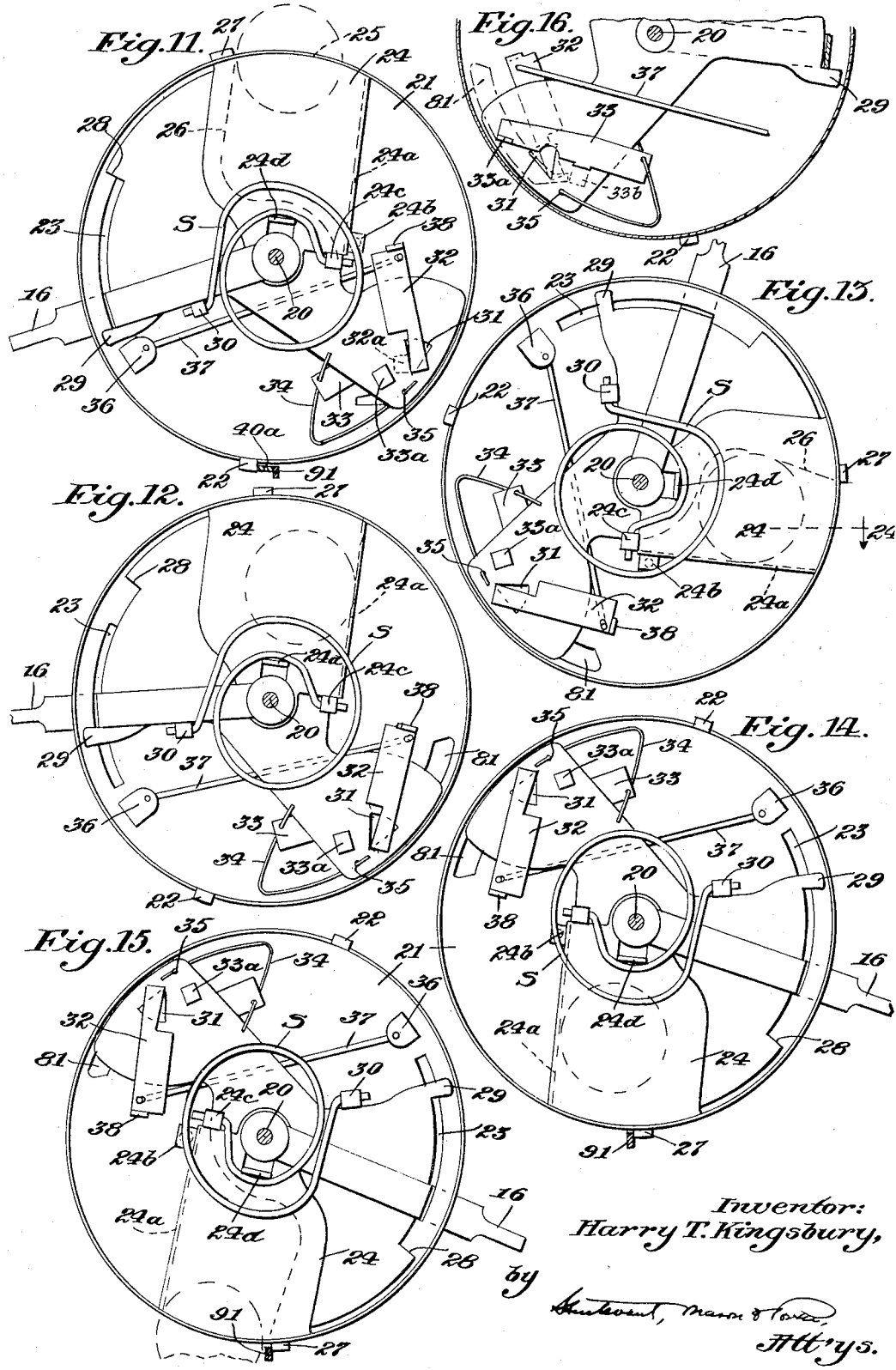
Inventor:
Harry T. Kingsbury,
by
Sturtevant, Mason & Porter
Att'ys.

Dec. 12, 1933.                H. T. KINGSBURY                1,939,353
                               REGISTERING BANK
                        Filed Aug. 29, 1931        5 Sheets-Sheet 5
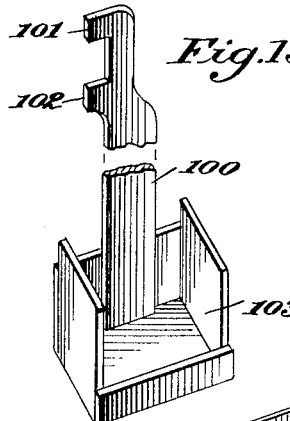
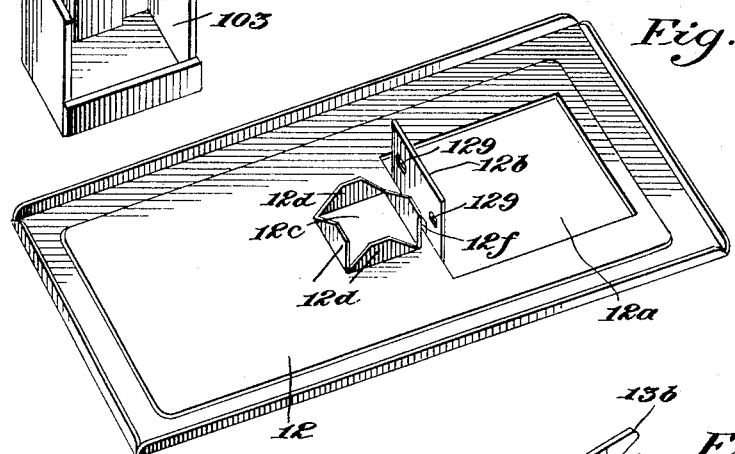
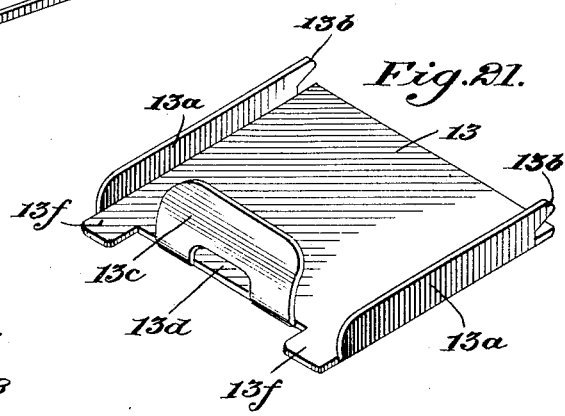
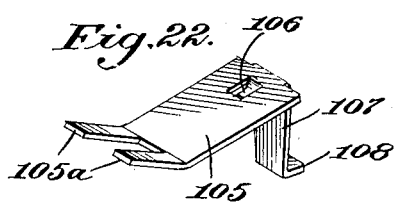
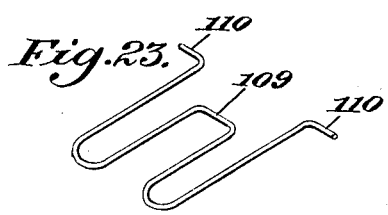
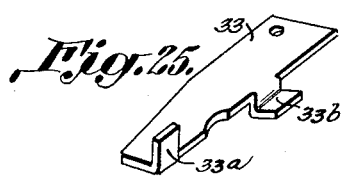
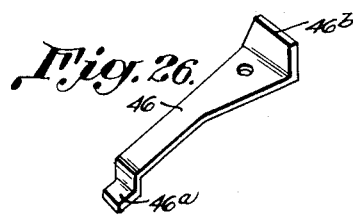
Inventor:
Harry T. Kingsbury,
by
Att'ys.

Patented Dec. 12, 1933

1,939,353

UNITED STATES PATENT OFFICE 1,939,353

REGISTERING BANK

Harry T. Kingsbury, Keene, N. H., assignor to Kingsbury Mfg. Company, Keene, N. H., a corporation of New Hampshire Application August 29, 1931. Serial No. 560,223

13 Claims. (Cl. 235—100)

This invention relates to improvements in coin registering banks and more particularly concerns a bank for registering coins of various denominations.

One of the features of the present invention is provision of a closed structure which may be maintained locked pending the deposit therein of a predetermined value of coins, the several parts being easily and cheaply constructed of sheet metal and wire.

Another feature of the present invention is the provision of an operating member for receiving and determining the size of the coin, and then operating a transfer member which passes through a length of stroke equivalent to the monetary value of the coin, the operating member including means for receiving the coin and for discharging it at the end of the registering operation.

A further feature of the invention is the provision of an operating member of the type described above in conjunction with means for preventing the return of the parts to coin-receiving position after registration of the coin has begun.

Further features of the invention comprise the particular assemblies and combinations of parts as will be set forth in the following specification and claims.

An illustrative form of construction of the device is represented on the accompanying drawings, in which:

Figure 1 is a face view of the registering bank.

Figure 1a is a top view of the casing, showing the coin slot.

Figure 2 is a rear view of the registering bank.

Figure 3 is a face view, on a larger scale, with parts broken away to show the coin receptacle with its latched door.

Figure 4 is a vertical diagrammatical section through the main shaft of the device.

Figure 5 is a section substantially on line 5—5 of Figure 3.

Figure 6 is a sectional view perpendicular to the main shaft, substantially on line 6—6 of Figure 4, and showing parts on the same scale as Figures 1 and 2.

Figures 7, 7a, and 8 are sectional views substantially on lines 7, 7a and 8 of Figure 4.

Figure 9 is a sectional view similar to Figure 6 but taken substantially on line 9—9 of Figure 5.

Figure 10 is a plan view of the transfer disk of Figure 9, on a larger scale, but showing diagrammatically the relationship of its several parts.

Figures 11, 12, 13, 14 and 15 are views on the same scale as Figures 3 and 10 and showing different operative positions of the parts indicated in Figure 7.

Figure 16 is a sectional view substantially on line 16—16 of Figure 5 and showing the full-stroke pawl.

Figure 17 is a perspective view of the multiple control cam and pawl.

Figure 18 is a perspective view of the transfer pawl.

Figure 19 is a perspective view of the locking plunger.

Figure 20 is a perspective view of the receptacle bottom before being attached to the casing.

Figure 21 is a perspective view of the coin door.

Figure 22 is a perspective view of the coin door latch.

Figure 23 is a perspective view of the coin door latch spring.

Figure 24 is a fragmentary sectional view through the drum substantially on line 24—24 of Figure 13.

Figures 25 and 26 are respective views of the full stroke pawl and the transfer pawl.

In the drawings is illustrated a bank which upon manipulation will accept coins of various denominations, determine the value of the inserted coin, register this value, and then deposit the coin in a receptacle. Also, devices are provided for preventing false operation, including means to prevent the withdrawal of the coin after registration has begun. The bank will receive and register coins, and deposit them in the receptacle which is latched until a predetermined total value has been accumulated and thereupon the coin receptacle may be unlatched for the removal of the coins.

The bank comprises a cylindrical upper casing 10 joined to which is a lower casing 11 providing the side walls of the coin receptacle. The bottom 12 is secured to this lower casing by spot welding, for example, and the two casings are joined together by similar means, so that coins once deposited can only be withdrawn through the coin door 13, unless the lower casing and its bottom be destroyed.

The rear wall 14 of the upper casing has an arcuate slot 15 therein extending for more than a half circle in the illustrative example. Through this slot projects the outer manually operable end of the handle 16.

Mounted within this upper casing is a shaft 20 loosely rotatable therein. Loosely surrounding the shaft 20 and close to the rear wall 14 of the upper casing is a drum 21 having a substantially closed rear wall and a forwardly directed flange with an outwardly extending resetting lug 22. The rear wall of the drum has an arcuate slot 23 of limited angular length through which the handle 16 passes, the handle being loosely mounted on the shaft 20 (Fig. 11). The coin wall 24 is spaced from the rear wall of the drum 21 by a distance greater than the thickness of the largest coin to be registered. At its outer edge it extends into the coin slot 25 (Fig. 24) provided in the flange wall of the drum 21, so that it is assured against peripheral movement with respect to the drum 21. The coin wall 24 has its edge 24a turned toward the drum 21 to provide an abutment wall against which the coins are pressed while being sized; and a lug 24b may also be provided for rigid connection to the rear wall of drum 21. The inner end of the coin wall is preferably formed with a bearing for the shaft 20 whereby to assist in holding the latter in its proper concentric position; and also with upturned lugs 24c and 24d for holding and guiding the inner end of the main spring S as will be described hereinafter.

Loosely mounted on the shaft 20 is a coin sizing rocker having the arcuate edge 26 (Figures 11 and 14), which operates in conjunction with the coin wall flange 24a for sizing the coin. This coin sizing rocker also includes a lug 27 extending upwardly through a coin slot 25, a shoulder 28 extending across the slot 23 and a spur 29 spaced from the shoulder 28 and likewise extending across the slot 23. It will be noted that the handle 16 passes between the spur 29 and shoulder 28 and thence through the slot 23 of the drum 21 and the slot 15 of the casing 10. This coin sizing rocker also includes a spring supporting lug 30 extending past the inner portion of handle 16 and engaged with the outer end of the spiral main spring S. This coin sizing rocker extends beyond its loose pivotal mounting on the shaft 20 and has apertures 31 for the reception of the offset aligning portion 32a of the sizing finger 32; as well as the offset portion 33b of the full-stroke pawl 33 which is held in its proper position, by a hairpin spring 34 having one end engaged in an aperture 35 of the sizing rocker to present its end 33a to the fixed rack 80 (Fig. 6), as described hereinafter.

An upstruck and offset lug 36 on the rear wall of the drum 21 provides a relatively fixed pivot for a sizing link 37 which, at its further end, is pivotally mounted in the sizing finger 32. The outer end of the sizing finger 32 has an angularly bent sizing lug 38.

Likewise loosely mounted on the shaft 20 is a transfer disk 40 (Figure 10) having a plurality of struck out coin-evaluating lugs which are spaced radially from the axis of the transfer disk 40 a distance determined by the diameter of the particular coin, and spaced peripherally from a neutral and initial radius of the transfer disk by an angular distance corresponding to the monetary value of the coin. In the present illustration, it has been assumed that the coins to be measured are United States tokens of the values of one, five, ten, twenty-five and fifty cents. The registering system includes a member totalizing to one dollar and then repeating, so that a full rotation of the transfer disk 40 would correspond to the registration of one hundred cents, and hence a half rotation (180°) is required and employed for the registration of a fifty cent piece; a movement of 90° for a twenty-five cent piece; a movement of 36° for a ten cent piece; a movement of 18° for a five cent piece; and a movement of 3.6° for a one cent piece: these angles having been diagrammatically represented in Figure 10. Hence, the lug 41 corresponds in radial and angular position to the one cent piece, the lug 41a to the five cent piece, the lug 41b to the ten cent piece, the lug 41c to the twenty-five cent piece, and the lug 41d to the fifty cent piece. This transfer disk also has a resetting lug 40a extending parallel to the axis, and a plurality of notches 40b which are located away from the resetting lug 40a by angular distances corresponding to the angles representing the monetary values of the several coins as given above. An offset lug 40c is also provided for engaging the transfer pawl 42 (Figure 18) which has a notch 42a to fit over the web connecting the lug 40c to the disk (Fig. 9), an integral spring piece 42b which bears outwardly against the peripheral wall of the casing 10, and the angularly directed pawl tab 42c for engagement with the toothed penny ratchet wheel 45 (Figure 8).

This penny ratchet wheel has teeth on its periphery in a number which is a multiple of one hundred. That is, the registration of any of the coins above results in a movement of an exact and predetermined number of teeth of the penny ratchet wheel 45 past a given point. This penny ratchet wheel is fixedly mounted on the main shaft 20 and rotates the latter. The ratchet wheel 45 has an aperture to receive the offset end 46a of the centesimal transfer pawl 46 having the hairpin spring 47 connected to the ratchet wheel 45 (Figure 8) and constantly urging the pawl 46 outwardly. The spring 47 is carried on the side of the ratchet 45 which is adjacent the transfer disk 40, this transfer disk being substantially free of encumbrances at this side, and by reason of its position the spring 47 holds the pawl 46 closely against the penny ratchet wheel 45.

Loosely mounted on a sleeve 48 (Figure 5) surrounding the shaft 20 is a dollar wheel 49 having a plurality of struck out lugs 49a directed rearwardly toward the penny ratchet wheel 45.

The dial 50 is preferably provided with a succession of circular depressions (Figure 5) to receive the proper indicia. The sleeve 48 is loosely rotatable within the dial. Mounted on the sleeve 48 and exposed at the front of the dial is a small hand 51 (Figures 1, 3 and 5) which operates past the inner numerals 1, 2, 3 . . . representing dollars. Frictionally held on the shaft 20 is a long hand 52 which moves opposite the outer row of Figures 0, 5, 10, 15 . . . representing the cents. The dial 50 preferably rests against the inturned lugs 10a of the upper casing 10 (Figures 4 and 5) and is covered by a crystal 53 which is secured in place by a bezel 54 having an outturned flange 55 permanently secured to the upper casing 10.

Engaged in the aperture 60 near the bottom of the upper casing 10 (Figure 8) is the hooked end 61a of the control member 61 having an outwardly projecting lug 61b at its other end for holding it in a plane transverse to the shaft 20. The upper or inner edge of the member 61 provides a cam for engaging the bent end 46b of the centesimal transfer pawl 46 (dotted line position, Figure 8) and holding it in a relatively inward position against the action of spring 47 for a predetermined angular distance. If the total registration to be accomplished is $10, as in the illustrated example, then ten equally spaced lugs 49a are provided on the dollar plate 49, and the angular length of the inner edge of member 61 is one-tenth of the circumference. This member 61 (Figure 17) has an inwardly extending web 61c with the two spring pawl members 61d and 61e formed thereon in different transverse planes through the shaft 20 so that they may respectively engage the penny ratchet wheel 45 and the transfer disk 40 and hold these against non-positive or frictionally produced rotary movement.

Fixed rotatably to the inner face of the rear wheel 14 of the upper casing 10 is a full-stroke rack 80 (Figure 6) extending for substantially 180°, and provided with internal teeth of the same angular pitch as the teeth on the penny ratchet wheel. The rear wall of the drum has an arcuate slot 81 therein terminating in the inwardly inclined portion 81a (Figure 2) through which the lug 33a of the full-stroke pawl 33 projects.

The top of the upper casing 10 (Figure 1a) is provided with a slot C through which a coin may be inserted into the bank. This insertion can only occur when the coin wall 24 and drum 21 have been rocked into such position that the coin chamber existing therebetween is positioned opposite the slot C and the coin sizing rocker has been moved to an open position, as will be described hereinafter. At all other positions, the periphery of the coin sizing rocker or of the drum wall itself prevents such an insertion. The upper casing 10 is provided at its bottom with an opening 90 (Figure 5) through which a coin may be dropped out of the coin member formed by the drum 21 and its coin wall 24, upon the closing of the registering operation and the release of the coin, so that the coin will enter the receptacle formed by the lower casing 11 and its floor 12. Adjacent the edge of this slot 90 the casing is provided with an inwardly directed stop lug 91.

The floor 12 has an aperture 12a therein (Figure 20) through which the coins may be removed, this floor having a struck-up latch keeper 12b formed integrally therewith, as well as a second aperture 12c formed by striking upward the guide walls 12d. The keeper 12b has a latch hole 12f and the spring securing holes 12g therein. The latch plunger comprises a stem 100 (Figure 19) having spaced lugs 101, 102 at its upper end and the bucket 103 at its lower end, this bucket being formed of sheet metal by flanging operations and secured to the stem 100 by spot welding, for example, so that a simple and cheap assembly is produced. The upper end of the stem 100 projects through an aperture 104 in the lower wall of the upper casing 10 so that the upper lug 101 is presented opposite (Figures 3 and 5) the periphery of the dollar wheel 49. This dollar wheel has a notch 49b at its periphery which is located in such a position with respect to the hand 51 that this notch is opposite the lug 101 when the dollar hand is being moved from the "9" to the "0" position and the long hand 52 is being moved from the "95" to the "0" position. At such time, the bucket 103 may be pushed upwardly so that the stem enters the notch 49b.

The door 13 (Figure 21) has the side flanges 13a with under-cut lugs 13b at the end for providing a releasably pivotal connection on the edge of the aperture 12a. The upturned latch flange 13c encloses the latch hole 13d, while lugs 13f prevent the forcing of the door into the lower casing 11. The latch piece 105 has an offset spring retaining lug 106 and the depending arm 107 with latch flange 108 thereon for engagement through the latch opening 12f into the latch hole 13d (Figure 3) but at its other end the piece 105 has a pair of extensions 105a which fit around the stem 100 and prevent accidental separation of the parts. The double hairpin spring 109 has the outwardly bent ends 110 for engagement through the spring holes 129 (Figures 5 and 20) and its middle portion is received beneath the lug 106. This spring holds the latch member between the wall 12d and the keeper 12b and tends to rock it in a counterclockwise direction into the latching position of Figure 3.

The operation of the device is as follows:

The operator seizes the handle 16 (Figure 1) and turns it in a counterclockwise direction. The main spring S by its engagement with the lugs 24c and 30, has been holding the coin sizing lever in its extreme clockwise position with respect to the drum assembly 21, 24 (Figure 7). The sizing finger 32, by its pivotal mounted connections to the sizing rocker and to the link 37 has been forced into the position in which its lug 38 is in the extreme radial outward position. The full-stroke pawl 33 with its pawl teeth 33a is in retracted position, the teeth being in the extension 81a (Figure 6) of the slot 81.

As the handle 16 is moved in the counterclockwise direction as aforesaid, it bears against the lug 29 and through the main spring S turns the drum and its parts, which are free for movement. During this movement of the drum, the lug 22 thereof ultimately engages the resetting lug 40a of the transfer disk 40 and moves it until it encounters the stop 91 of the upper casing 10. This movement of the lug 40a restores the transfer disk 40 to the proper initial position in which the notch 40b nearest the lug 40a is engaged with the holding pawl 61e. During this return movement of the transfer disk 40, the pawl 61d has been retaining the penny ratchet wheel 45 against movement, and the transfer pawl 42 has been clicking freely over the penny ratchet wheel 45. The parts are now in the extreme counterclockwise position of free movement, (Figure 7).

If the handle 16 is forced along in the counterclockwise direction, it travels in the slot 15 of the drum, which is now held stationary by the stop 91, and by pressure against the lug 29 and the spring lug 30 moves the sizing rocker against the torsional effect of the main spring S into the position shown in Figure 11. The sizing rocker and its lug 27 have now been withdrawn from opposite the coin slot C of the upper casing 10 and the coin may be inserted through the slots C and 25 into the space between the rear wall of drum 21 and the coin wall 24.

When the handle 16 is released, the main spring S returns the sizing rocker in the clockwise direction relative to the drum so that its sizing edge 26 engages the coin and presses the latter against the sizing flange 24a. Owing to the shape and position of these members, the coin can enter only one position in the coin member thus formed, and the sizing rocker is brought to a predetermined angular position according to the diameter of the particular coin. Therewith, the sizing finger 32 is carried bodily with the sizing rocker, but is caused to swing in a plane transverse to the shaft 20 by the engagement of the sizing link 37 therewith; and during the return of the sizing rocker, this sizing finger 32 is moved into the position, for example, as shown in Figure 12. If the coin be a twenty-five cent piece, as in the illustration, the end lug 38 is presented at a definite radial distance from the shaft 20 and held therein. The full-stroke pawl 33 has been carried bodily with the sizing rocker and its pawl tooth 33a has been pushed radially outward by the spring 34 and has traveled along the outer wall or slot 81, and returned freely for a part of the length of slot 81 during the sizing of the coin.

The handle 16 is now located (Figure 12) between the lug 29 and the end wall of the slot 23, and is free for movement for this distance which is an idle movement and varies according to the particular coin being registered. At the end of this movement the handle 16 engages the end wall of the slot 23 and drives the drum 21 directly (Figure 13), in a clockwise direction, until the lugs 27 of the sizing rocker engage the stop 91 (Figure 14). During this movement, the sizing rocker 38 has been carried in an arcuate path about the axis of shaft 20 and at a distance therefrom determined by the size of the coin. These paths have various means and are diagrammatically shown in the arcuate lines on disk 40 in Figure 10. During this movement, the lug 38 encounters one or the other of the transfer lugs 41, 41a, 41b, 41c, 41d and thereafter drives the transfer disk 40 ahead of it in a clockwise direction and through an angle corresponding to the remaining angular distance before the lug 27 encounters the stop 91 and which angle corresponds to the angular magnitudes set out diagrammatically in Figure 10 for the various coins. The transfer pawl 42 engages with the teeth of the penny ratchet wheel 45 and carries the penny ratchet positively therewith for a corresponding angular distance, and this wheel 45 in turn drives the shaft 20 and turns the hand 52 to indicate the corresponding monetary value of the coin upon the dial. Likewise, the pawl tooth 33a of the full-stroke pawl has engaged the full-stroke rack 80 so that the handle cannot be moved backwardly in a counterclockwise direction for the removal of the coin from the machine.

After the parts have reached the position of Figure 14, a further clockwise movement of the handle 16 will drive the drum 21 while the coin rocker is held in fixed position by the engagement of its lug 27 with the stop 91. Ultimately the wall 24a will have been pushed so far beyond the coin sizing wall of the sizing rocker that the coin is forced to drop out of the drum and through the slot 90 into the coin receptacle formed by the lower casing 11 (Figure 15). Immediately upon the relative movement of the drum sizing rocker thus occasioned, the sizing finger 32 is again given a radially inward movement by the action of the sizing link 37 and its sizing lug 38 slips from the particular lug 41, 41a, 41b, 41c, 41d of the transfer disk, so that the transfer disk is immediately disconnected from the positive movement heretofore given it by the sizing lug 38. In such position, the retaining pawl finger 61e (Figure 17) engages with the notch 40b corresponding to the monetary value of the coin which has just been registered and serves to determine the proper and exact end position.

When the handle 16 is now released, the main spring S returns the drum into its initial angular position with respect to the sizing rocker. It will be noted, particularly, that the slot 23 is substantially of the same angular magnitude as the distance between the lug 29 and the shoulder 28. During this initial return movement, the sizing rocker restores the sizing finger 32 to its extreme outward initial coinless position, and the full-stroke pawl 33 (Figure 16) is moved from the position shown therein into the free position (Figure 6). While in the position of Figure 16, any retrograde or counterclockwise movement of the handle 16 was prevented by the engagement of the pawl tooth 33a with the rack 80, it will be noted that in the position of Figure 6, this pawl tooth is held out of engagement with such rack 80 and hence free movement of the drum relative to the casing may occur when no coin is present in the mechanism.

The following registering movement is accomplished in the same manner. The initial part of the counterclockwise movement of the handle 16 merely turns the drum freely within the casing. Ultimately, the drum lug 22 as before engages the return lug 40a of the transfer disk 40 and pushes the latter around into its proper initial position. A continued movement of the handle moves the sizing rocker for the insertion of a coin, and the operation is continued as before. During the counterclockwise movement of the handle, the penny ratchet wheel 45 has been retained in its position by the retaining pawl 61d (Figures 8 and 17) so that the penny ratchet wheel and its hand 52 remain in position. Hence, the second operation results in the addition of a partial rotation of the penny ratchet wheel 45 by a fractional revolution corresponding to the angular distance diagrammatically indicated in Figure 10, and hence to the addition of the successive monetary values of the coins.

When the hand 52 has reached a position, for example, opposite "90", the centesimal transfer pawl 46 is raised upon the control member 61 and is now presented opposite one of the transfer lugs 49a of the dollar wheel. The movement of the penny hand 52 from "90" to "0" is therefore accompanied by a movement of the dollar wheel, positively produced through the pawl 46 and lug 49a, through the same angular distance, whereby the dollar hand 51 is moved, for example, from "0" to "1".

During the continued deposit and registering of coins, the periphery of the dollar wheel 49 remains opposite the lug 101 of the stem 100 and hence the stem 100 cannot be pushed inward. The lower casing 11 is therefore closed by its latched door 13. As soon as the notch 49b however comes opposite the lug 101, an upward pressure on the bucket 103 causes the stem 100 to move upwardly and the edge of the bucket 103 pushes upwardly on the fingers 105a of the latch member, causing a clockwise rocking of this member about a roll or pivot formed by its engagement with the flange 12b (Figure 3) and its latching flange 108 is withdrawn from the hole 13d in the latch flange 13c of the door 13, and this door is free to fall out so that the coins may be removed.

The spring 109 returns the bucket 103 and stem 100 into the lowermost position, where they are retained in engagement with the wall of the lower casing 11 (Figure 5). When the coins have been removed, the door 13 is seated with its lugs 13b in position and then is rocked home so that its curved locking flange 13c represses the flange 108 of the latch member 105 until the flange 108 can snap into the hole 13d again under the urgency of spring 109. The device is now tentatively relatched, and immediately upon the movement of the hand 51 and dollar wheel 49 so that the notch 49b is no longer opposite the lug 101, the relatching is complete.

It is obvious that the invention is not limited to the form of illustration shown but that it may be modified in many ways within the scope of the appended claims.

What is claimed:

1. In a device of the class described, a coin receiving member, a sizing member pivotally mounted for movement relative to said coin member, a finger pivotally mounted on said sizing member and having a connection to said coin receiving member whereby the finger is caused to move arcuately upon relative movement of said members and is held in a predetermined position when a coin of a given denomination is between said members, means for moving said members together, and devices operated by said finger selectively according to the radial position of said finger whereby to register a value dependent on the diameter of the coin.

2. In a device of the class described, a casing, a coin receiving member oscillatable in said casing, a sizing member coaxially oscillatable with respect to said casing and coin memebr, said casing having a slot therein through which a coin may be introduced into said coin member, a stop on said casing, a lug on said sizing member, means for moving one of said members in one direction whereby to separate the members to receive a coin and for rotating said members together in other direction until said lug encounters said stop and thereafter to move said coin member independently of the sizing member whereby to disengage said sizing member from said coin member to permit the withdrawal of a coin located therebetween, and spring means for moving said members toward one another for sizing a coin and for holding said members for mutual operation by said moving means.

3. In a device of the class described, an oscillatable coin receiving member, a sizing member coaxially mounted for angular movement relative to said coin member, a coaxially mounted transfer disk, a register operated by the movement of said disk in one direction, a plurality of value determining lugs located on said transfer disk at radial distances dependent on the diameters of the coins to be registered and at angular distances dependent on the monetary value of the coins, a device mounted on one of said members to move therewith, and means connecting said device with the other said member whereby said device is presented for engagement with a selected one of said members according to the relative angular position of said members with a coin therebetween.

4. In a device of the class described, a casing, a coin receiving member, a sizing member cooperative with said coin member for sizing a coin therein, a transfer disk, a low value register, a high value register, means for operating said transfer disk according to the value of the coin in said coin receiving member during relative movement of said members and said casing, means for transferring movement from said disk to said low value register, a pawl on said low value register, a cam on said casing engageable by said pawl for transferring from said low value register to said high value register, and means formed integral with said cam for detaining said transfer disk in its moved position.

5. In a device of the class described, a casing, a coin receiving member, a sizing member cooperative with said coin member for sizing a coin therein, a transfer disk, a low value register, a high value register, means for operating said transfer disk according to the value of the coin in said coin receiving member during relative movement of said members and said casing, means for transferring movement from said disk to said low value register, a pawl on said low value register, a cam on said casing engageable by said pawl for transferring said low value to said high value register, and means formed integral with said cam for detaining said low value register in its moved position.

6. In a device of the class described, a casing, a coin receiving member, a sizing member cooperative with said coin member for sizing a coin therein, a transfer disk, a rotatable low value register, a high value register, means for operating said transfer disk according to the value of the coin in said coin receiving member during relative movement of said members and said casing, means for transferring movement from said disk to said low value register, a pawl on said low value register, a cam on said casing engageable by said pawl for transferring said low value to said high value register, and means formed integral with said cam for detaining said low value register in its moved position and to prevent movement of said register parallel to its axis.

7. In a device of the class described, a casing, a coin receiving member, a sizing member cooperative with said coin member for sizing a coin therein, a stop on said casing, a lug on said coin member, a transfer element, a lug on said transfer element, means for moving said members in one direction whereby to bring said lugs into engagement with one another and said stop to determine an initial position of said members and disk, means controlled by the relative positions of said members for operating said transfer element in accordance with the monetary value of a coin located between said members during relative rotation of said members with respect to the casing in the other direction, a lug on said sizing member, said moving means serving upon movement in said other direction to move said transfer element according to the monetary value of the coin and to present said sizing lug against said stop and thereafter to move said coin member for releasing the coin from its position between said members.

8. In a device of the class described, a casing, a coin receiving member, a sizing member movable with respect to said coin member, a spring associated with said members to move them toward one another whereby to size a coin therebetween, a handle for engaging and moving said sizing member away from said coin member, means on said coin member for engagement by said handle to move the same and said sizing member in the other direction, a stop on said casing, and a lug on said sizing member for engagement with said stop near the end of said movement in said other direction, so that the completion of said movement in the other direction will cause the relative movement of said members to disengage the coin from therebetween.

9. In a device of the class described, a casing, a coin receiving member, a sizing member cooperative with said coin member for sizing a coin therein, means rigid with the coin member providing a slot having an offset end, a rack on said casing, a spring-pressed full-stroke pawl mounted on said sizing member for engaging the rack and held when in said offset end out of engagement with said rack, and means for moving said sizing member with respect to said coin member whereby to displace said pawl from said offset end and into engagement with said rack, said means serving at the end of the movement to produce the discharge of the coin, so that thereafter said full-stroke pawl will return into the offset end of said slot.

10. In a device of the class described, a casing, a coin receiving member, a sizing member cooperative with said coin member for sizing a coin therein, a transfer disk, a register, means positioned during relative movement of said members for operating said transfer disk according to the value of the coin in said coin receiving member during relative movement of said members and said casing, means for transferring movement from said disk to said register, and an element fixed to the casing having two resilient pawls integral therewith, one of said pawls cooperating with said register and the other pawl with said disk for holding said register and disk in their moved positions.

11. In a device of the class described, a casing, a coin receiving member, a sizing member, a transfer disk, and a register all coaxially mounted in said casing, a spring connected to said members for moving them toward one another whereby to size a coin, a stop on said casing, a lug on one said member, a lug on said transfer disk, and means for moving the other of said members whereby to operate through said spring for moving the said one member therewith so that the lug on said one member will engage the lug on said disk and move the same against said stop whereby to detain said one member, said moving means thereafter operating to displace said other member to separate said members for the reception of the coin.

12. In a device of the class described, a coin receiving member, a sizing member movable with respect to said coin receiving member, manually operable means for separating said members to permit the insertion of a coin therebetween, a spring for moving said members toward one another to a position determined by the diameter of the coin being sized, a sizing finger and means for moving said finger in a direction at an angle to the direction of relative movement of said members during the sizing movement, means for moving said coin receiving and sizing members together from a coin receiving to a coin discharging position, and register means operated by said finger during the movement of said members between said positions.

13. In a device of the class described, a coin receiving member, a sizing member movable with respect to said coin receiving member, manually operable means for separating said members to permit the insertion of a coin therebetween upon movement of said means in one direction, a spring for moving said members toward one another to a position determined by the diameter of the coin being sized, a sizing finger and means for moving said finger in a direction at an angle to the direction of relative movement of said members during the sizing movement of said manually operable means including a device operative during movement of said manually operable means in the opposite direction for moving said coin receiving and sizing members together from a coin receiving to a coin discharging position, and register means operated by said finger during the movement of said members between said positions.

HARRY T. KINGSBURY.